Aug. 16, 1966  R. O. GORDON  3,266,522
HYDRAULIC VALVE
Filed Dec. 20, 1963  2 Sheets-Sheet 1
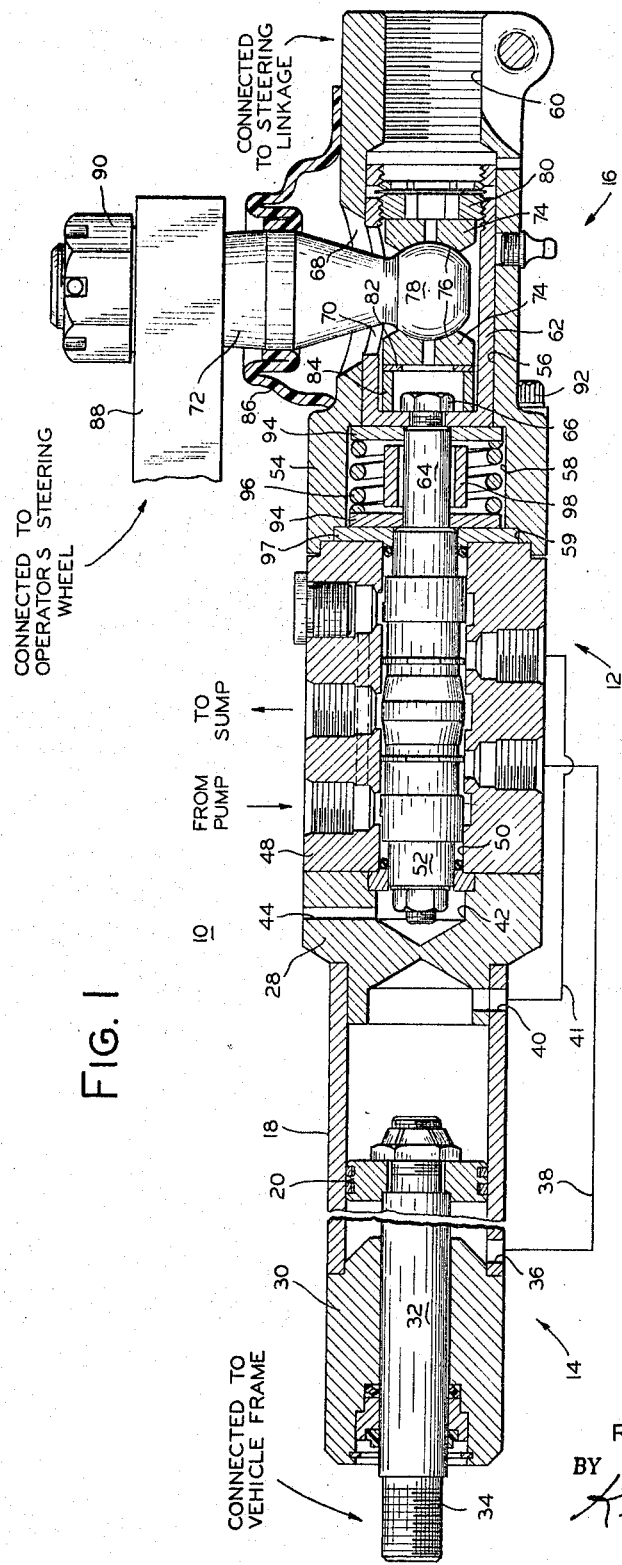
INVENTOR
RICHARD O. GORDON
BY
Kenneth C. Witt
ATTORNEY

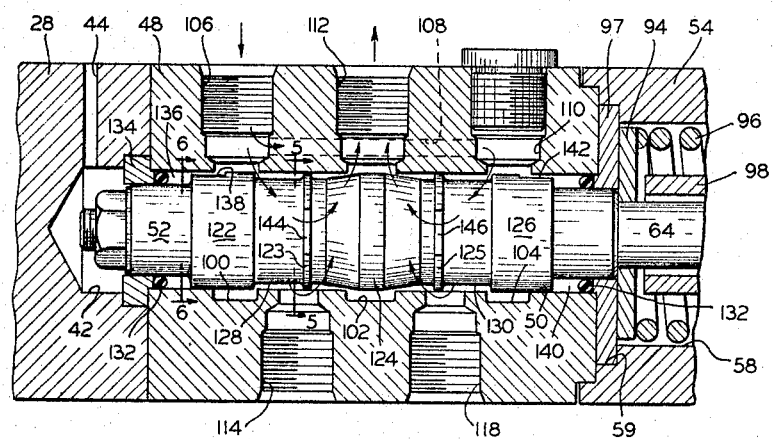

United States Patent Office 3,266,522
Patented August 16, 1966

1

3,266,522
HYDRAULIC VALVE
Richard O. Gordon, New Buffalo, Mich., assignor to Clark Equipment Company, a corporation of Michigan
Filed Dec. 20, 1963, Ser. No. 332,083
2 Claims. (Cl. 137—625.69)

This invention relates to hydraulic valves, and more particularly to so-called open-center, four-way valves of the type which may be utilized as a control valve in power steering systems.

As used herein an open-center valve means a valve which is so arranged that when the valve is in the neutral position hydraulic fluid flows continuously through the valve from the inlet port to the outlet port without significant restriction. When the valve is moved from the neutral position to an operating position, pressure immediately builds up because the fluid is redirected to a servo motor or similar device and can no longer flow directly to the outlet port, the pressure being dependent upon the resistance that must be overcome to operate the servo motor; and this enables the energy of the pressurized hydraulic fluid to be utilized for operating a servo motor or other device. "Four-way" valve as used hereinafter has reference to the fact that the valve has four ports. One of these is an inlet port and another is the outlet port, while the other two ports are connected to the servo motor or other device to be operated by the valve.

In a vehicle having dirigible wheels and equipped with a servo type power steering system there is generally a double-acting piston and cylinder type fluid actuator connected at one end to a fixed part of the vehicle frame and connected at the other end to the steering linkage so that extension and retraction of the piston rod causes the dirigible wheels to pivot in one or the other direction, thus steering the vehicle. The flow of fluids to and from the cylinder is controlled by a power steering control valve which may be a four-way open-center valve. The servo type power steering system also has follow-up means whereby the position of the dirigible wheels of the vehicle is directly responsive to the position of the operator's steering wheel or, in other words, the position of the dirigible wheels changes only so long as the operator's steering wheel is being turned. To provide such a follow-up arrangement mechanically the valve body of the power steering control valve conveniently may be connected to the steering linkage, while the valve spool of the power steering control valve is connected to the operator's steering wheel through an intermediate linkage which normally includes a drag link and Pitman arm linkage which is connected through a sector gear and a worm gear to the operator's steering wheel. If desired, the piston and cylinder type actuator and the power steering control valve conveniently may be a unitary assembly.

Also, while there is referred to herein a vehicle having dirigible wheels which may be turned with respect to the frame or body portion of the vehicle in order to accomplish steering, it will be appreciated that the power steering systems embodying the valve of this invention likewise may be utilized with an articulated vehicle. Such a vehicle has two separate frame portions, a tractor portion and a trailer portion, with the two frame portions interconnected by combined draft and steering coupling and it is steered by pivoting one frame portion of the vehicle with respect to the other frame portion.

2

A servo type power steering system functions satisfactorily in a large majority of installations; however, a small percentage of vehicles equipped with such a power steering system do not react smoothly. On these vehicles equipped with such a power steering system do not react smoothly. On these vehicles the force required to break the dirigible wheels loose and begin steering while the vehicle is standing still, or moving very slowly, is substantially greater than the force required to keep the dirigible wheels moving in steering operation once they are in motion. In such vehicles it appears that when the operator's steering wheel is moved to initiate valve spool travel relative to the valve body, the power steering pump pressure applied to the power steering cylinder begins to build up to a peak pressure without any substantial movement of the power steering actuator, steering linkage or dirigible wheels. Energy also is being stored in the flexing of the tires relative to the surface thereon; in the mechanical "wind-up" of the steering linkage, ball joints, king pin bearings; deflection in the linkages; hose expansion; etc. When the wheels finally begin steering movement, the entire system accelerates very rapidly whereby the system quickly acquires a relatively high velocity. The valve body or spool (depending upon the type of control valve in the system and its arrangement therein) consequently moves past or overshoots the neutral position to an open position in the opposite direction, directing pressure fluid to the other end of the cylinder. The same energy build-up occurs in the opposite direction. When the energy build-up is sufficient the dirigible wheels again break loose and the system accelerates as before, acquiring a relatively high velocity in the opposite direction and the control valve body or spool again overshoots the neutral position. Such action may be self-sustaining, causing the dirigible wheels and linkage to be subject to violent forces and motions. This action or oscillation is ordinarily described as chatter or shinny. It may sometimes be induced with a snap of the steering control wheel when the vehicle is standing still or while it is rolling slowly.

The overshooting of the control valve body or spool past the neutral position and resultant oscillation is a very costly and serious problem to the manufacturers of power steering systems and servo devices. There are a number of arangements used by such manufacturers to try to correct power steering systems, i.e., control chatter or oscillation; however, none of these arrangements is completely effective. Most of the arrangements make use of fixed orifices, bevelled cuts on the edges of the spool, tapered notches, dash pots in the valves, hydraulic reaction areas in the steering control valves, or a combination of these. Generally, these arrangements require a compromise in order to stabilize a vehicle having power steering which is subject to chatter. For example, stabilizing the power steering system may result in undesirably high force being required to turn the operator's steering wheel or an undesirably high back pressure in the neutral position of an open center control valve with the result that the fluid in the system tends to heat up which may shorten the life of the steering pump.

The present valve incorporates the advantages of the valve disclosed in my U.S. Patent No. 3,106,938 issued October 15, 1963, and the valve disclosed in my co-pending continuation-in-part application, Serial No. 315,118, filed October 4, 1963, now Patent 3,176,721, issued April 6, 1965, (common assignee) in a single valve using different and simpler structure.

It is a principal object of my invention to provide means to stabilize a power steering system without resulting in an unduly large force being required at the rim of the operator's steering wheel to steer the vehicle and without producing an unduly high back pressure in the neutral position of the system.

Another object of my invention is to provide a valve that prevents cyclic overshooting or oscillation in a servo system.

In carrying out my invention in one form thereof, I provide an elongated valve body having a longitudinally extending bore. Communicating with the bore is a pair of longitudinally spaced-apart fluid inlet ports adjacent the ends of the bore, a fluid outlet port disposed between the fluid inlet ports and a pair of longitudinally spaced-apart fluid motor ports located respectively between the fluid outlet port and the fluid inlet ports. A spool is slidably disposed in the bore and has five longitudinally spaced-apart lands thereon. The two outermost lands on the spool define a chamber adjacent each end of the spool. A chordal groove extends partially across the outer surface of each of the two outermost lands and serves to communicate the adjacent chamber with the adjacent fluid inlet port when the spool is centered. As the valve spool is shifted in one direction fluid is forced out of one of the fluid chambers first through the connecting chordal groove and then through the clearance between the spool and bore when the chordal groove is shut off. At the same time communication between the other fluid chamber and inlet port through the connecting chordal groove is maintained. The two intermediate lands on this spool are disposed so that each of the fluid motor ports overlaps one of them whereby there is substantially unrestricted fluid flow from the inlet ports to the outlet port when the spool is in the centered position. The two intermediate lands are further arranged so that if the spool is shifted in one direction substantially unrestricted fluid flow between one of the fluid inlet ports and the respective fluid motor port is maintained while direct fluid communication between the other of the fluid motor ports and the outlet port is cut off. The two intermediate lands are each provided with a notch which serves to define with the bore an orifice so that when direct fluid communication is cut off between the fluid motor port and the outlet port that restricted fluid flow is provided through the respective orifice.

The above objects and other objects, features and advantages of my invention will become more readily apparent to a person skilled in the art from the following detailed description when taken in conjunction with the attached drawing in which:

FIGURE 1 is a longitudinal section of a power steering assembly embodying my invention;

FIGURE 2 is an enlarged fragmentary view of the control valve of FIG. 1;

FIGURES 3 and 4 are similar to FIG. 2, except that the valve spool has been shifted from the neutral or centered position to a partially opened position and a fully open position, respectively;

FIGURE 5 is a cross-sectional view taken along line 5—5 of FIG. 2; and

FIGURE 6 is a cross-sectional view taken along line 6—6 of FIG. 2.

Referring now to FIG. 1, the numeral 10 denotes generally a power steering mechanism including a control valve 12 to which is secured at opposite ends thereof respectively a double-acting piston and cylinder type fluid actuator or motor 14 and a ball stud control assembly 16.

Fluid actuator 14 includes a cylinder 18 and a piston 20 slidably disposed within cylinder 18 for reciprocal movement therein. The cylinder 18 is secured to a cylinder head end portion 28, preferably by welding. Secured to the other end of cylinder 18 is a piston rod end portion 30. A piston rod 32 is connected to piston 20 and extends outwardly through piston rod end portion 30 and has a threaded end 34 which is adapted to be pivotally connected to a vehicle frame. A port 36 communicates with the interior of cylinder 18 at the piston rod end thereof and has a fluid conduit 38 connected thereto. Similarly, a port 40 communicates with the interior of cylinder 18 at the head end thereof and is connected to a fluid conduit 41. Fluid conduits 38 and 41 communicate with control valve 12 as will be explained more fully shortly.

Cylinder head end portion 28 has disposed in the right end surface thereof a bore 42. Bore 42 is connected with the atmosphere by means of a passage 44 which, as will be seen, serves to bleed off any fluid leaking into bore 42 which otherwise would become trapped therein and prevent proper operation of steering control valve 12. The control valve 12 has a body or housing portion 48 which is secured to the right end of cylinder head portion 28. A bore 50 extends longitudinally through valve body 48 and has slidably disposed therein a valve spool 52.

Secured to the end of valve body 48 opposite cylinder head end portion 28 in a manner to be explained is ball stud control assembly 16. Control assembly 16 includes a housing 54 which has a longitudinally extending bore 56, a counterbore 58, a recess 59 and an internally threaded portion 60 adjacent the end opposite valve body 48. Threaded portion 60 forms part of a pivotal connection between power steering assembly 10 and the steering linkage (not shown). A cup-shaped sleeve member 62 is slidably disposed in bore 56 and connected to a necked down portion 64 of spool valve 52 by means of a bolt and nut assembly 66, as shown. Aligned openings 68 and 70 are provided in housing 54 and sleeve 62, respectively, for a ball stud 72. The ball stud 72 is held in a socket formed by a pair of blocks 74 disposed in sleeve 62, each having a hemispherical surface 76 which cooperates with a ball portion 78 of stud 72, thus providing a connection capable of limited pivotal movement in any direction. Blocks 74 are held in abutment with ball portion 78 by member 80 which threadably engages sleeve 62. In order to prevent the ball stud connection from rattling, a spring washer 82 is inserted between an annular spacer 84 and the adjacent one of blocks 74. A resilient cover 86 fits around stud 72 and against housing 74 to prevent dirt and other foreign matter from entering the ball stud connection. A drag link 88 may be connected to control ball stud 72 and may be held in place by means of a castellated nut 90. Drag link 88 ordinarily is connected to a pitman arm (not shown) which in turn is connected through a suitable sector and worm gear mechanism to the operator's steering wheel so that rotational movement of the steering wheel results in axial movement of valve spool 52.

The control assembly 16, control valve 12 and fluid actuator 14 are secured together to form power steering assembly 10 by means of a plurality of long-shanked machine screws 92 which extend through housing 54 of control assembly 16 and valve body 48 and threadably engage cylinder head end portion 28. Machine screws 92 are tightened down so that the abutting ends of cylinder head end portion 28, valve body 48 and housing 54 are held in fluid sealing relation.

Disposed in counterbore 58 is a pair of washers 94 through which necked down portion 64 of valve spool 52 passes and which are held in abutment with sleeve 62 and the shoulder formed by the necked down portion 64, respectively, by a helical spring 96 disposed between the washers. Also when spool 52 is centered, one of the washers 94 abuts an annular ring 97 which is held in recess 59 between valve body 48 and control housing 54. The washers 94 and helical spring 96 cooperate with sleeve 62, the shoulder of valve spool 52 and annular ring 97 to maintain valve spool 52 in a centered or neutral position or return it thereto, as shown in FIG. 1. Disposed between washers 94 and within helical spring 96 is an annular spacer member 98 which serves to limit the stroke of valve spool 52 in either direction by the amount of clearance between spacer 98 and washers 94.

Referring now also to FIGS. 2 through 6, valve body 48, as pointed out hereinabove, includes a longitudinally extending bore 50. Disposed in bore 50 are three longitudinally spaced-apart annular grooves 100, 102 and 104. An inlet port 106 in the valve body communicates directly with groove 100, and also is in communication with groove 104 by means of connecting passages 108 and 110. The inlet port 106 is adapted to be connected to a source of pressurized fluid. An outlet port 112 in the valve body communicates directly with groove 102. Outlet port 112 can, of course, be connected to a sump or reservoir (not shown) by any suitable fluid passage means. A fluid motor or actuator port 114 is disposed between grooves 100 and 102 and opens into bore 50. The outer end of port 114 is connected to fluid conduit 38 (FIG. 1) so that fluid motor port 114 is in communication with the piston rod end of the interior of cylinder 18. Another fluid motor or actuator port 118 is disposed in valve body 48 between grooves 102 and 104. Fluid motor port 118 is connected to fluid conduit 41 (FIG. 1) so that fluid motor port 118 communicates with the head end of the interior of cylinder 18.

Referring now principally to FIG. 2, valve spool 52 is shown disposed in the neutral or centered position. Valve spool 52 has five longitudinally space-apart annular lands 122, 123, 124, 125 and 126. Lands 122 and 123 define therebetween an annular groove 128 and lands 125 and 126 define therebetween an annular groove 130. It will be noted that fluid motor port 114 is always in communication with groove 128, and similarly fluid motor port 118 is always in communication with groove 130.

Each end of valve spool 52 is sealed to prevent the escape of pressure fluid by means of an O-ring type seal 132 of resilient material which is prevented from being pushed out of bore 50 due to the force exerted thereon by pressure fluid by a metallic back-up washer 134 at one seal and ring 97 at the other seal.

The land 122 together with the adjacent seal 132 and bore 50 defines a fluid chamber 136 which in the neutral position of the valve is in communication with groove 100 by means of a chordal groove 138 (see FIG. 6) which extends partially across the surface of land 122. Similarly, a fluid chamber 140 is defined by land 126, seal 132 and bore 50 at the other end of valve spool 52. Chamber 140 is in fluid communication, in the neutral position of the valve, with groove 104 by means of a chordal groove 142 which extends partially across the surface of land 126. As will be explained in more detail hereinafter, these chambers and chordal grooves function as dash pots under certain conditions of valve operation.

The lands 123 and 125 are disposed so that in the neutral position of the valve fluid motor port 114 overlaps land 123 and fluid motor port 118 overlaps land 125. That is, fluid motor ports 114 and 118 provide paths by which fluid may flow from one side of lands 123 and 125 to the other side thereof. Also, land 123 includes a notch or flat 144 (see FIG. 5) in the periphery thereof. Notch 144 defines with the wall of bore 50 a fixed orifice which provides a restricted fluid flow path between opposite ends of land 123. A notch or flat 146 is located in the periphery of land 125 and defines with the wall of bore 50 a fixed orifice which provides a restricted fluid flow path between the opposite ends of land 125.

When the valve spool 52 is in the position shown in FIGS. 1 and 2, steering control valve 12 is in a neutral position. In neutral, the fluid flow is in through inlet port 106, the fluid flow dividing with one-half of the fluid flowing to groove 100 and one-half of the fluid flowing to groove 104. From groove 100 the fluid flow is into groove 128, through the orifice formed by notch 144 or around land 123 via fluid motor port 114 and then to groove 102. Similarly fluid flow from groove 104 is to groove 130, through the orifice formed by notch 146 or around land 125 via fluid motor port 118 and then to groove 102. From groove 102 the fluid flow is to outlet port 112 and hence to the sump or reservoir. The flow of fluid through the valve 12 in the neutral condition is substantially unrestricted so that only minimal pressures are built up in the valve. This results in the pump which is supplying inlet port 106 with fluid being in a substantially unloaded condition which is highly desirable. Also, fluid chambers 136 and 140 are in fluid communication with grooves 100 and 104, respectively, and fluid motor ports 114 and 118 are in communication with grooves 128 and 130, respectively. Thus, the valve will be maintained full of fluid and minimal pressure will be maintained on each side of piston 20.

Referring now principally to FIG. 3 wherein spool valve 48 is shown displaced slightly to the right so that groove 100 is no longer in communication with groove 128, land 124 closes off communication of port 118 with outlet port 112 and land 123 cuts off direct fluid communication with groove 102 via port 114, the fluid flow to and from cylinder 18 is such that actuator 14 extends with the result that the steering angle of the dirigible wheels is changed in one direction. In this condition of control valve 12 fluid flow is from a pump to inlet port 106 which connects with groove 104 and hence to groove 130. From groove 130 fluid flow is through fluid motor port 118, passage 41 to the head end of the interior of cylinder 18. At the same time, fluid is being forced out of the piston rod end of cylinder 18 and via conduit 38 and fluid motor port 114 into groove 128. From groove 128 the fluid flow is through the orifice formed by notch 144 to groove 102 and hence to the sump via outlet port 112. At this point of spool displacement, chambers 136 and 140 are both still in fluid communication with grooves 100 and 104, respectively. However, fluid is being forced out of chamber 140 at a restricted rate via chordal groove 142.

Referring now principally to FIG. 4 wherein valve spool 52 is shown shifted to the extreme rightward position so that chamber 140 is no longer in direct fluid communication with groove 104 via chordal groove 142, the fluid flow remains the same as the fluid flow in the position of the valve shown in FIG. 3, except that the fluid trapped in chamber 140 had to be forced out through the clearance between land 126 and bore 50 with the further rightward movement of spool 52 after groove 142 was no longer in direct communication with groove 104.

It will be understood that fluid seals, such as O-rings, although not described in detail, except for seals 132, have been used throughout the power steering assembly 10 where necessary to provide means for preventing fluid leakage between various surfaces.

Turning now to the operation of the above-described embodiment of my invention, it will be assumed that power steering assembly 10 as associated with a vehicle having dirigible wheels and that movement of ball stud 72 to the right as seen in FIG. 1 causes the steering angle of the dirigible wheels to change so that the vehicle makes a right turn when traveling forwardly. Assuming now that valve spool is initially in the neutral position shown in FIGS. 1 and 2, the vehicle will travel in a straight line and pressure fluid will flow from the pump through steering control valve and return to the sump with substantially unrestricted flow. Further, fluid pressure will be maintained on each side of piston 20 so that should the dirigible wheels hit any normal obstructions the vehicle will not deviate from a straight line.

Now, if ball stud 72 is actuated to the right so that the valve spool 52 is moved from the position shown in FIGS. 1 and 2 to the position shown in FIG. 3, the steering angle of the dirigible wheels will be changed so that the vehicle will execute a right turn. Because movement of valve spool 52 to the right directs pressure fluid to the head end of cylinder 18 the valve body 48 is caused to move to the right so that the relationship of valve spool 52 and valve body 48 is returned to the neutral position shown in FIGS. 1 and 2. This last described action is generally termed follow-up and results in a power steering system which is dependent upon continued movement of the spool for continued change of steering angle of the dirigible wheels. Steering speed is dependent upon the extent of displacement of valve spool 52 relative to valve body 48, the fastest steering speed being obtained when the valve spool 52 is fully displaced, as shown in FIG. 4.

It will now be apparent that during steering the piston 20 is held on one side by a force resulting from the pump pressure acting against piston 20 and is held on the other side by a force resulting from the fluid back pressure generated by the orifice formed by notch 144 or 146. This back pressure tends to decelerate the mass of the dirigible wheels and steering linkage in the situation where energy is stored in the power steering system prior to the system breaking loose and steering the dirigible wheels, as explained earlier. In many cases the force generated by the back pressure will be sufficient to prevent valve body 48 from overshooting the neutral position, and thereby prevent the power steering system from oscillating.

It will be noted that as spool 52 is being moved to the right, fluid is being forced out of chamber 140 into groove 104 by way of chordal groove 142. When spool 52 is shifted sufficiently far enough to the right the fluid remaining in chamber 140 can no longer be forced out through chordal groove 142, but must flow through the clearance between land 126 and bore 50 in the area of chordal groove 142. (While the drawings do not appear to show a clearance between bore 50 and spool 52 because of its small size, it will be appreciated that there is actually a clearance of 0.0002–0.0003 inch.) The force required to force the fluid out of chamber 140 across land 126 is offset in part by the pressure of fluid in chamber 136 which exerts a force against land 122.

The net result is that to move spool 52 from the position shown in FIG. 3 to the position shown in FIG. 4 at a normal steering speed requires approximately an additional four pounds of force at the rim of the operator's steering wheel in addition to approximately two pounds of force required to overcome the bias of the centering spring.

As I have explained just above the back pressure caused by the orifices may be sufficient to prevent overshooting of the power steering control valve; however, under extreme conditions the power steering control valve may overshoot in spite of the back pressure generated by the orifices. Assuming that the power steering system breaks loose as the dirigible wheels are turning toward the right, the valve body 48 will accelerate rapidly to the right and overshoot the neutral or centered position since the back pressure due to the orifices will not be sufficient to hold it at the neutral position. As valve body 48 moves past the neutral or centered position, fluid contained in chamber 136 is forced out into groove 100 by way of chordal groove 138 and then through the clearance between bore 50 and spool 52 when body 48 has moved far enough to close off chordal groove 138. The result of all this is that chamber 136 acts as a dash pot and body 48 cannot move faster than a predetermined rate because any faster rate of movement would result in a fluid displacement rate from chamber 136 that would raise the fluid pressure therein to a point where the force being exerted on body 48 to move it to the right would be less than the force exerted by the pressure fluid in chamber 136 to retard rightward movement of body 48. Consequently, before body 48 can return toward or overshoot the neutral position to any extent, depending upon the amount of energy stored in the power steering system, the energy stored in the power steering system will have had time to be dissipated through unwinding of the steering linkage, unflexing of the tires, etc. It will be appreciated that when chamber 136 is acting as a dash pot to retard overshooting of valve body 48 there is a substantial force applied to spool 52 which tends to move it to the right; however, because of the lead angle of the worm and sector gear connection of the operator's steering wheel to the valve spool 52, the amount of force required to turn the worm gear in reverse through the sector gear is so high that there is almost no force transmitted to the steering wheel valve spool 52.

While I have shown and described only a single embodiment of my invention in conjunction with a power steering system, it will be understood that numerous modifications, changes, and substitutions could be made thereto by a person skilled in the art without departing therefrom. For example, the hook-up of the steering control valve may be reversed, i.e., the valve spool may be connected to the steering linkage and the valve body may be operatively connected to the operator's steering wheel. For this reason the detailed description and drawing are intended to be illustrative only. The scope of my invention should be determined from the appended claims taken in conjunction with the prior art.

I claim:

1. A valve comprising an elongated body having a longitudinally extending bore therein, first and second longitudinally spaced-apart inlet ports, an outlet port disposed intermediate the said inlet ports and first and second fluid motor ports disposed respectively between the said outlet port and the said first inlet port and between the said outlet port and the said second inlet port, all of the said ports communicating with the said bore, a spool slidably disposed in the said bore for movement from a centered position to a first or second position, the said spool having first, second, third, fourth and fifth longitudinally spaced-apart lands disposed so that the said first and fifth lands cooperate with the said first and second inlet ports to control fluid flow to the said fluid motor ports and the said outlet port, the said third land cooperates with the said outlet port to conrol fluid flow from the said inlet ports and fluid motor ports to the said outlet port and the said second and fourth lands cooperate respectively with the said first and second fluid motor ports to control fluid flow from the said fluid motor ports to the said outlet port, a first notch in the said second land, and a second notch in the said fourth land, the said notches being disposed to cooperate with the said bore to form orifice means between the ends of the respective lands.

2. A valve comprising an elongated body having a longitudinally extending bore, first and second longitudinally spaced-apart fluid inlet ports in the said body, a fluid outlet port in the said body located intermediate the said inlet ports, first and second fluid motor ports in the said body located respectively between the said first fluid inlet port and the said outlet port and between the said second fluid inlet port and the said outlet port, all of the said ports communicating with the bore, a spool slidably disposed in the said bore, first, second, third, fourth, and fifth longitudinally spaced-apart lands on the said spool, the said first and fifth lands defining with the said bore a pair of fluid chambers located at opposite ends of the said bore and adjacent the said inlet ports, a pair of passage means connecting respectively the said first inlet port with the adjacent chamber and the said second inlet port with the adjacent chamber in a centered spool position, the said passage means being disposed so that when the relative position of the said spool and body is shifted a predetermined distance in one direction from the said centered spool position one of the said passage means continues in communication with the adjacent inlet port while communication of the other of the said passage means with the adjacent inlet port is cut off, the said second and fourth lands being disposed so that when the relative position of the said spool and body is shifted from the centered position a predetermined distance in one direction one of the said inlet ports continues in direct communication with one of the said fluid motor ports while direct communication between the other of the said fluid motor ports and said outlet port is cut off, and orifice means for providing restricted fluid flow from the said other fluid motor port to the said outlet port when direct communication between them is cut off.

References Cited by the Examiner

UNITED STATES PATENTS

| | | | |
|---|---|---|---|
| 2,167,106 | 7/1939 | Dunham et al. | 137—675.69 |
| 2,307,585 | 1/1943 | Harrington et al. | 137—625.69 |
| 3,176,721 | 4/1965 | Gordon | 137—625.68 |

M. CARY NELSON, *Primary Examiner.*

HENRY T. KLINKSIEK, *Examiner.*